(12) United States Patent
Conard

(10) Patent No.: US 9,545,179 B2
(45) Date of Patent: Jan. 17, 2017

(54) EXHAUST TURBULENCE ATTENUATOR FOR INDUSTRIAL AND SHOP VACUUM CLEANING UNITS

(71) Applicant: Christopher L. Conard, Setauket, NY (US)

(72) Inventor: Christopher L. Conard, Setauket, NY (US)

(*) Notice: Subject to any disclaimer, the term of this patent is extended or adjusted under 35 U.S.C. 154(b) by 21 days.

(21) Appl. No.: 14/470,728

(22) Filed: Aug. 27, 2014

(65) Prior Publication Data

US 2016/0058254 A1 Mar. 3, 2016

(51) Int. Cl.
*B01D 46/02* (2006.01)
*B01D 29/27* (2006.01)
*A47L 9/00* (2006.01)
*A47L 9/14* (2006.01)

(52) U.S. Cl.
CPC ........... *A47L 9/0081* (2013.01); *B01D 46/023* (2013.01)

(58) Field of Classification Search
CPC ....... B01D 46/02; B01D 46/002; B01D 29/27; A47L 9/00; A47L 9/14

USPC ............. 55/341.1, 378, 385.1, 429, 467, 486,55/DIG. 2, DIG. 3; 15/246.3
See application file for complete search history.

(56) References Cited

U.S. PATENT DOCUMENTS

| | | | | |
|---|---|---|---|---|
| 3,479,802 A | * | 11/1969 | Fesco | A47L 9/14 156/263 |
| 4,749,386 A | * | 6/1988 | Strohmeyer | A47L 9/00 55/374 |
| 5,240,484 A | * | 8/1993 | Genovese | A47L 9/14 15/246.3 |
| 5,522,908 A | * | 6/1996 | Frey | B01D 46/02 55/309 |
| 6,875,248 B1 | * | 4/2005 | Shelton | B01D 46/002 55/341.1 |

* cited by examiner

*Primary Examiner* — Jacob T Minskey
*Assistant Examiner* — Minh-Chau Pham

(57) ABSTRACT

The invention disclosed is an appliance which, when attached as an accessory to a heavy-duty vacuum cleaning unit such as may be used in industrial applications, as well as in professional and home workshop environments, attenuates exhaust port turbulence on such machines, providing an overall cleaner and safer work environment.

9 Claims, 6 Drawing Sheets

EXHAUST TURBULENCE ATTENUATOR FOR INDUSTRIAL AND SHOP VACUUM CLEANING UNITS

CROSS REFERENCE TO RELATED APPLICATIONS

This application claims the benefit of U.S. Provisional Application No. 61/871,086, filed Aug. 28, 2013.

STATEMENT REGARDING FEDERALLY SPONSORED RESEARCH OR DEVELOPMENT

NA

BACKGROUND OF THE INVENTION

The present invention relates to accessories for heavy-duty vacuum-type cleaning units such as those found in industrial applications, as well as in professional equipment kits and home workshop environments. Such equipment is referred to hereinafter as "cleaning units", "vacuums", or "cleaning equipment." More particularly, the invention disclosed herein is an appliance which, when attached as an accessory to a heavy-duty vacuum cleaning unit attenuates exhaust port turbulence on such machines, providing an overall cleaner and safer work environment.

A vast range of accessories for heavy-duty and shop-type vacuum cleaners exists. For example, there exist carbon filter systems intended to be used as an add-on to such vacuum cleaners to capture volatile organic compounds emitted in waste or exhaust streams, which for purposes of this disclosure may be referred to as "post cycle supplemental filtration" given that the primary waste air flow results from intake air being drawn into one or more internal filters inherent to a vacuum cleaning unit. A prime example of such a post-cycle supplemental filtration unit is found at http://www.apsimplepsaltery.com/shopvac.htm. Another related concept is presented at http://www.instructables.com/id/Making-a-sound-baffle-for-loud-shop-vacuums/, where the do-it-yourself instructions provided are intended to result in a shop vacuum cleaner exhaust noise reduction baffle.

Numerous other examples of accessories for industrial and shop-type vacuums are to be found. The majority of these items, such as high efficiency particulate air (HEPA) filters, are directed largely to components and systems designed to inhibit the discharge of noxious substances or irritants and allergens into the waste air flow of a vacuum cleaner or cleaning system. Similarly, a smaller group of accessories attempt, as indicated by the latter example in the preceding paragraph, to minimize the noise level attendant with the operation of a powerful vacuum cleaner motor. For example, patent application U.S. Serial Number 20060179601, submitted by Crevling et al., discloses a removable internal air diffuser intended to reduce noise associated with the generation and discharge of high-speed airflows.

While it is known in the art that various aspects of the exhaust flow streams emanating from a variety of types of equipment may be effectively managed to bring about a reduction in the decibel level produced by many types of machines, there appears to be only an extremely limited body of physical solutions directed towards reducing the turbulence of vacuum cleaner exhaust flows, and this outcome appears to be an unintentional byproduct of other desired aspects of the few attachments and accessories that provide post-cycle supplemental filtration.

More particularly, a wide variety of exhaust airflow filters for various exhaust-generating units and systems are known in the art. In the case of vacuum cleaners and related systems, common—and rather similar—solutions are directed primarily at noise attenuation. The inventive concepts claiming to resolve the issue of high output-air-related noise levels involve a range of internal and external baffles, mufflers, and the like. For example, U.S. Pat. No. 8,261,406 granted to Kunz et al., covers a vacuum with multiple exhaust points, and claims the construction provides for quieter, lower velocity discharge of the air from the vacuum source. The operating principle is that the multiple exhaust points are supplied from a radially extending chamber that is defined between upper and lower panels. The radially extending chamber has both vertical and radial sections that operate to slow the velocity of the exhaust air to reduce the noise generated by the vacuum. Like Kunz, most of these concepts, when reduced to practice, are relatively simplistic in principle while complex in terms of their construction and number of parts. Moreover, apart from expensive and sensitive high-efficiency particulate filters geared towards allergen capture, and related components such as cartridges, frames, etc., few, if any of these filters, mufflers, or baffles are directed to limiting the discharge of fine particulates from the waste air stream, presumably on the assumption that filtration prior to the airflow reaching the motor is adequate.

More importantly, none of these accessories appears to be directed at effectively managing turbulent exhaust discharge flow, which can be highly problematic, for example by forcefully and powerfully disturbing particulates that have previously settled out of ambient air, or by unsettling fragile objects, for example precision tools or parts on a laboratory or workshop bench. A prime illustration of the problem raised is found in the example of a turbulent and powerful exhaust flow stirring up fine drywall dust that may have settled upon surfaces following the sanding of joint compound applied to seal the interstices of installed drywall panels. The scattering and random redistribution of fine particulate matter into the atmosphere of the immediate work area in large part defeats the attempts to clean with a shop-type vacuum cleaner, requiring laborious sweeping and wet mopping.

Therefore, given the heretofore unmet need of a device capable of reducing exhaust flow turbulence from a vacuum cleaning unit, while not diminishing the efficacy of the unit by reducing suction capacity or placing additional strain on the unit's motor, there is a clear need for an exhaust stream turbulence attenuating unit which is easily adapted and fitted to a broad range of vacuum cleaning units, which is low in cost, and which functions without diminishing the performance of the device to which it is attached.

BRIEF SUMMARY OF THE INVENTION

The invention comprises an exhaust turbulence attenuator of simple but robust and effective design and construction for industrial, shop-type, and other vacuum cleaning units.

The essential design of the device entails in part a tubular sleeve which may be compressed to fit into an existing exhaust port or may just as easily be slipped over a projecting exhaust port to firmly engage with that portion of a cleaning unit. The tubular sleeve in turn leads to a protective cage or case which is characterized by a rigid nature, while at the same time featuring a significant number of penetrations or apertures which may take the form of stamped or otherwise formed holes, ports, or slits. Contained within this cage are several layers of synthetic fabric attenuation elements, which are closed at their respective distal ends and open to the cleaning unit's exhaust port at their proximal ends. These diffusion elements are nested one within the other, and in a typical configuration a maximum of three such elements provide the desired function of dissipating exhaust flow and attenuating turbulence.

The great advantage of the invention is that any type of debris may be effectively removed and contained in a cleaning unit with an absolute minimum of the debris material being dispersed into the environment. By way of example, in a woodworking facility, it would be desirable to prevent the further dispersion and subsequent suspension of fine sawdust particles in the workshop's air during the course of cleaning up at the end of a work day. Such particles might imaginably settle on freshly-varnished or lacquered surfaces, spoiling the surfaces and requiring additional laborious sanding, etc. In a hospital environment, it might be desirable to expedite the cleaning of an operating room, although the likelihood of undesirable particulate dispersal by an unmitigated vacuum exhaust air stream limits the usefulness of such cleaning unites as currently commonly configured. It should be noted that the advantages realized by utilizing the invention—greatly simplified and highly effective cleaning unit with a minimum of effort and vastly reduced chances of resuspending particulate matter—are achieved with extreme ease of installation and no required manipulation or operation beyond the act of affixing the invention to a cleaning unit.

The invention comprises the following basic elements:
1. A flexible attachment collar
   Enables the invention to be attached to the cleaning unit as an accessory by means of a simple friction-based fit contiguous with the exhaust air port of the cleaning unit.
2. An external shield unit
   Provides robust protection and containment for the diffusion elements
3. Diffusion elements
   Receive the exhaust air stream and induce a vortex in the airflow while concurrently channeling turbulence through a plurality of uniformly-distributed apertures.

Various appropriate materials may be used for the bodies of the various elements including but not limited to: thermoplastics, polymers, thermosetting polymers, fiberglass, fiber reinforced recycled plastics, and metals.

BRIEF DESCRIPTION OF THE DRAWINGS

The following drawings are attached in explanation of the invention, the features of which are referenced within the detailed description of the invention. Elements in the drawing figures are not necessarily drawn to scale. The same reference numerals in different figures denote the same elements. Note that, although the example presented of the invention is generally cylindrical as illustrated throughout the following drawings, the invention may be configured in several cross-sectional shapes without any appreciable resultant efficacy.

In order to better understand the drawings, the following legend is provided:
Flexible attachment collar 10
Proximal clamping unit 20
Distal clamping unit 30
Inner diffusion element 40
Mid-layer diffusion element 42
Outer diffusion element 44

It should be noted that the external shield unit is not depicted.

Figure 1:
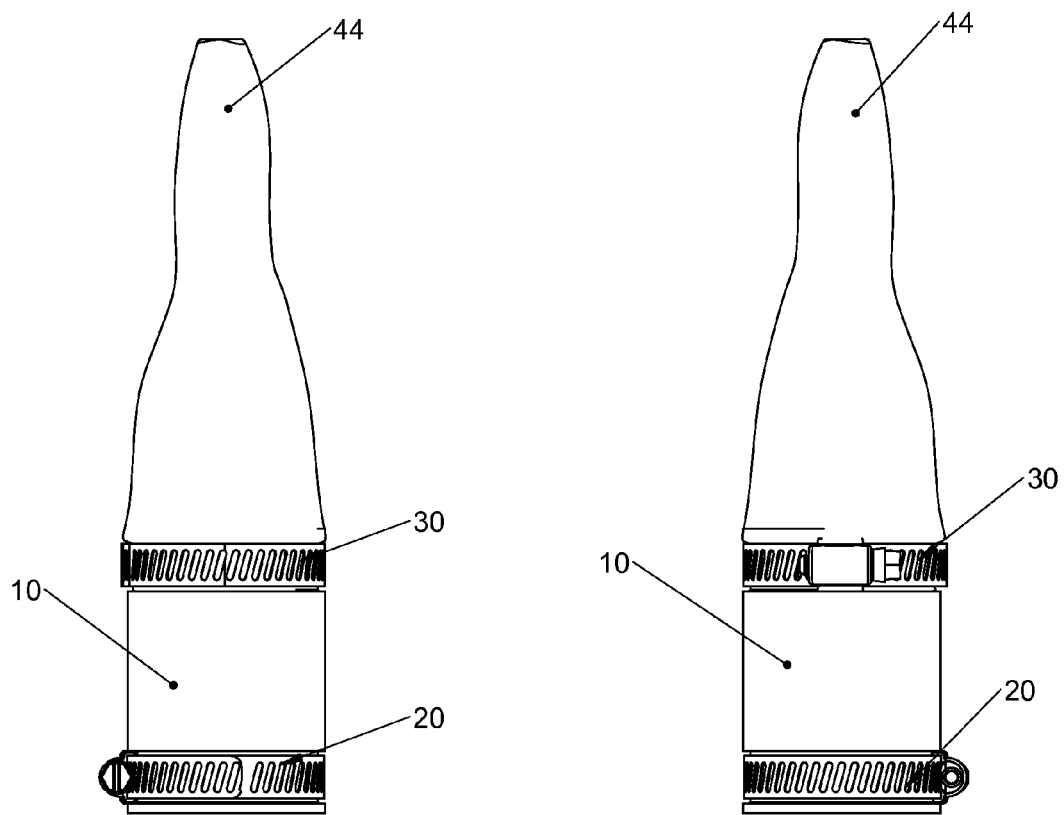

FIG. 1: This figure presents a top view of the entire invention 1 showing all of the exposed constituent elements 10, 20, 30, and 44 assembled as a unit. The depiction is of the device unattached to a cleaning unit and not subject to internal partial pressurization as would normally be the case if attached to an operating cleaning device.

Figure 2:
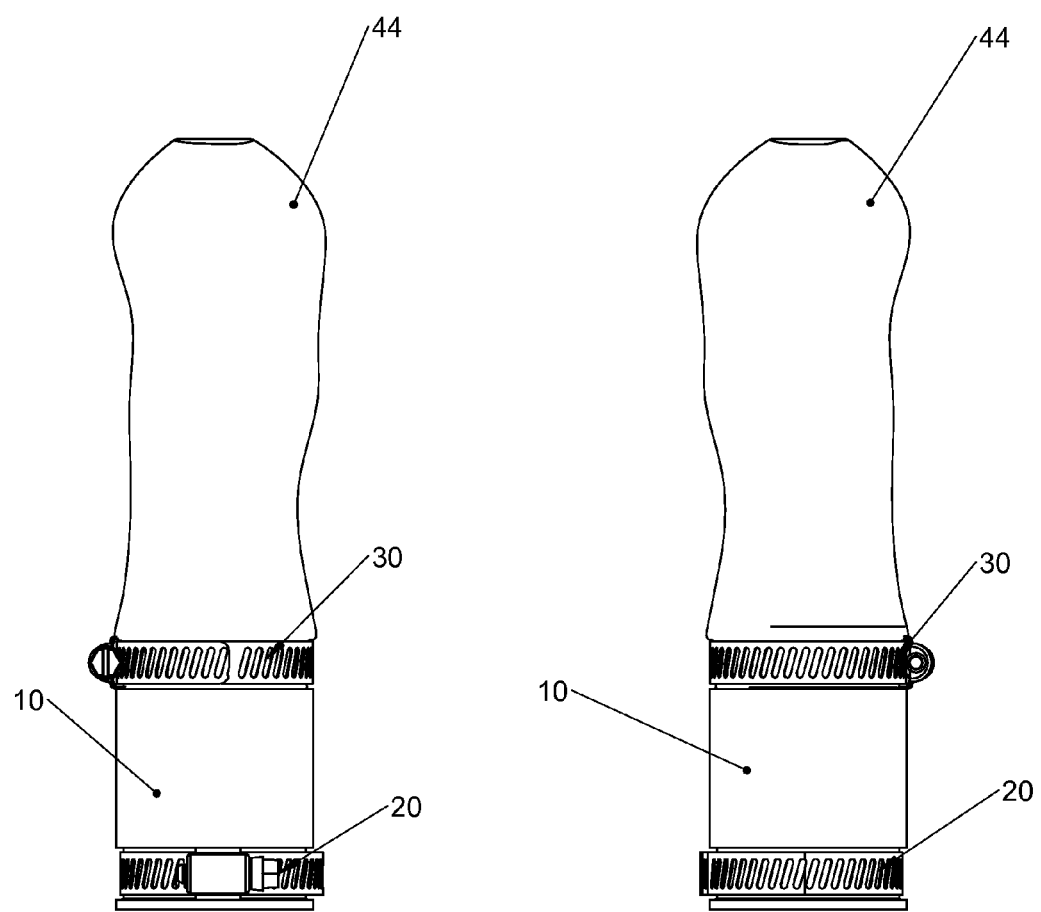

FIG. 2: This figure presents a top view of the entire invention showing all of the exposed constituent elements 10, 20, 30, and 44 assembled as a unit, and depicting the invention in a partially pressurized state as it would be if connected to an operating cleaning device (distal end of outer diffusion element 44 visibly enlarged).

Figure 3:
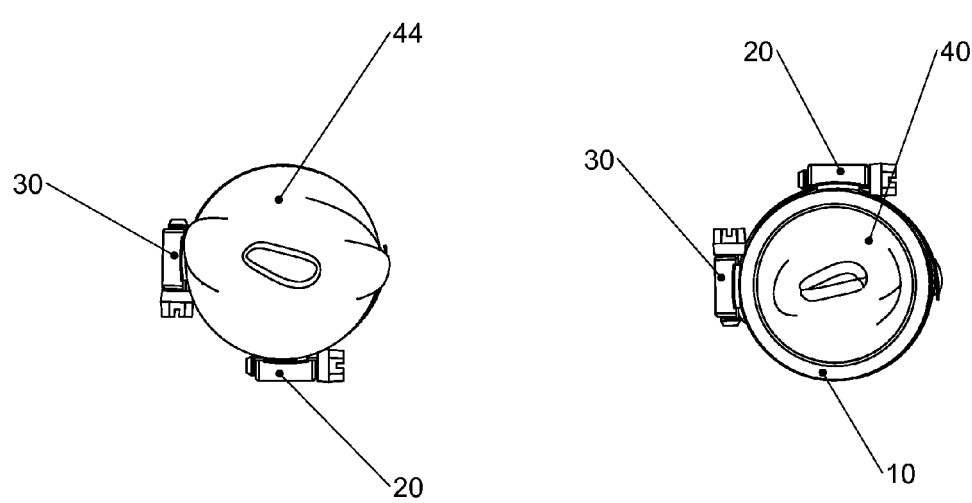

FIG. 3: This figure presents both a proximal and distal end-on view of the invention.

Figure 4:
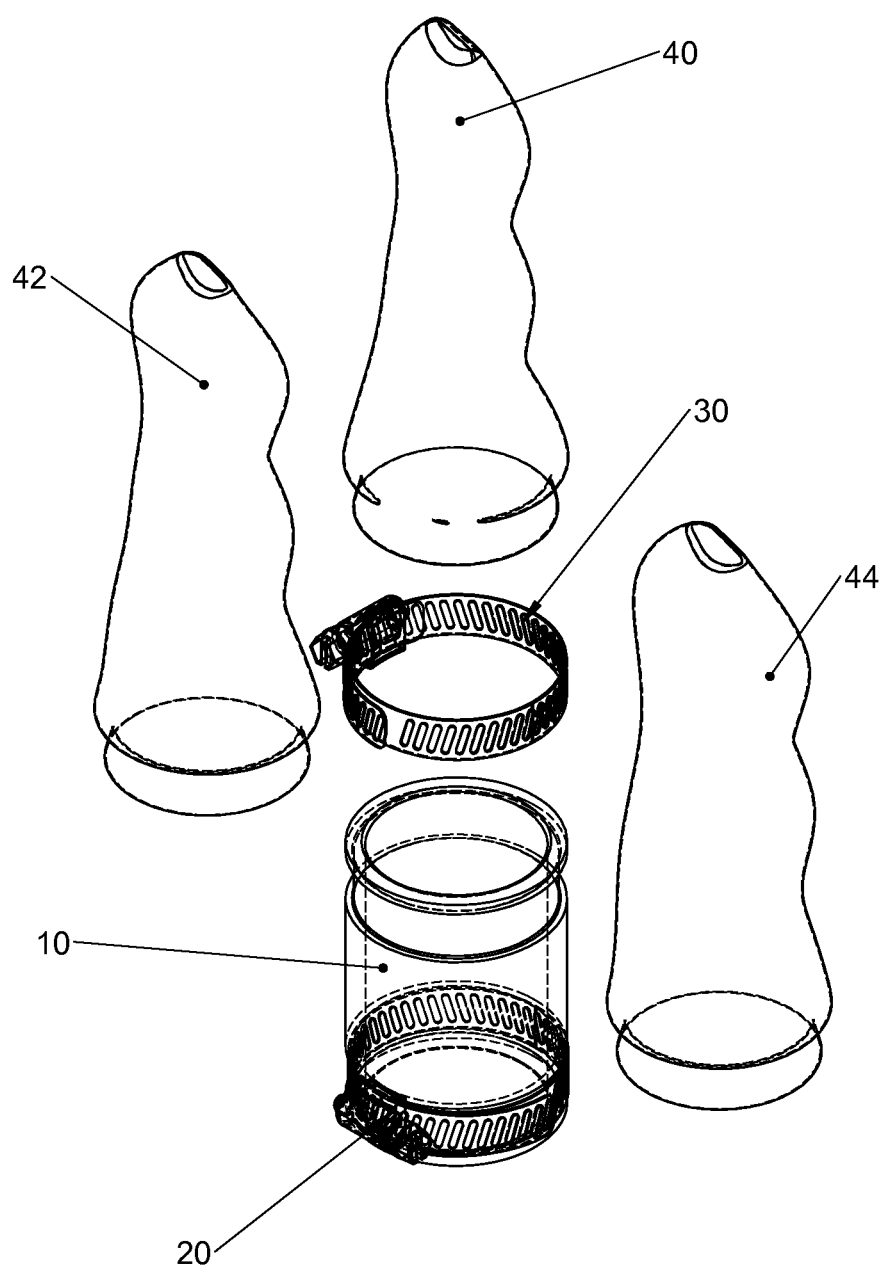

FIG. 4: This figure presents an exploded view of all components 10, 20, 30, 40, 42, and 44.

Figure 5:
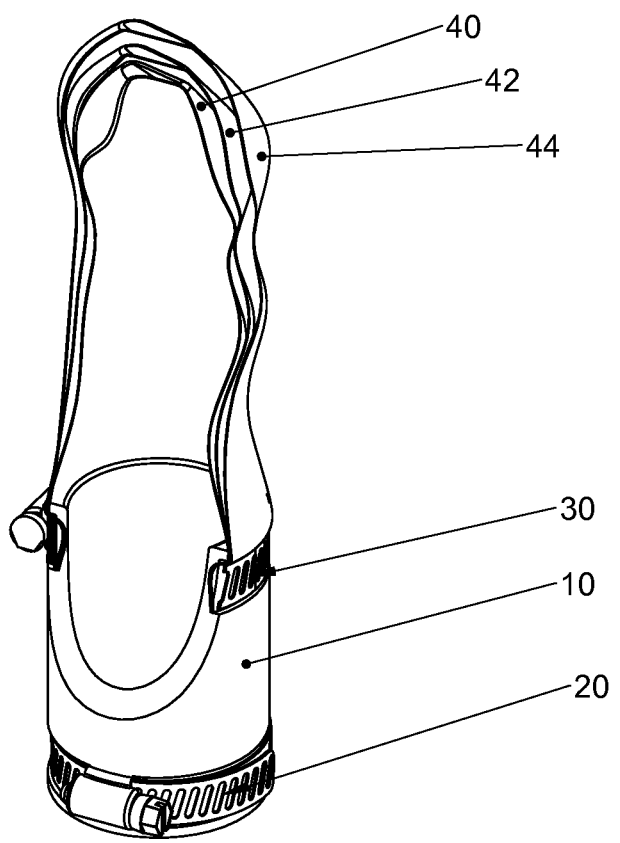

FIG. 5: This figure depicts a cross-sectional view of the invention and in particular depicts in detail the manner in which the diffusion elements 40, 42, and 44 are spatially arranged in relation to each other.

Figure 6:
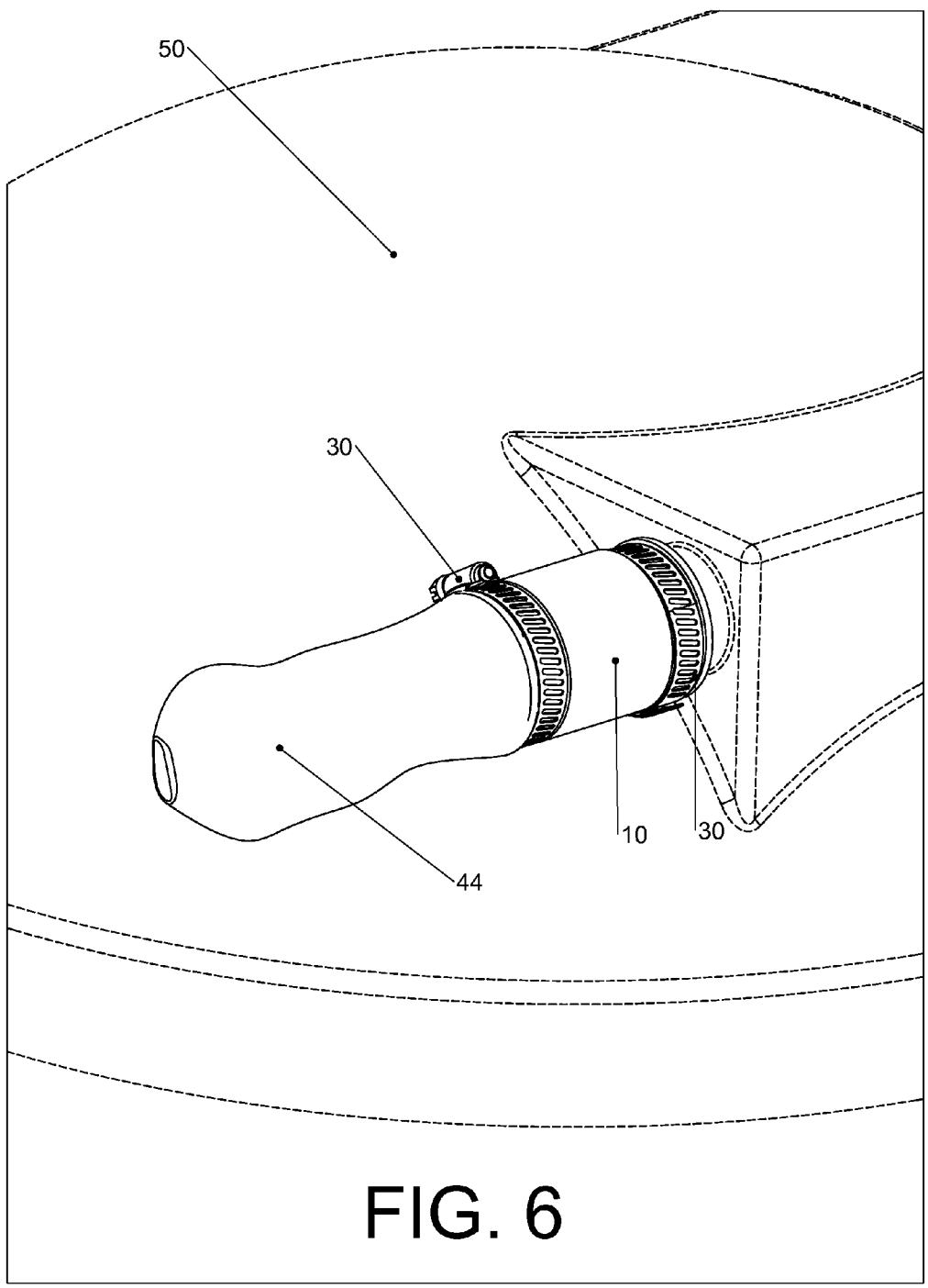

FIG. 6: This figure depicts a side elevational view of the invention attached to the exhaust port, represented by dashed lines, of a typical vacuum cleaning unit 50.

DETAILED DESCRIPTION OF THE INVENTION

The invention is a turbulence attenuating accessory for vacuum or suction cleaning units which comprises a connector or adaptor leading to a series of interconnected diffusion elements which significantly reduce the speed and control the flow of an exhaust or waste air stream.

The invention, in order of assembly, includes:
1. a flexible attachment collar 10 secured to a cleaning unit (not part of the invention) by proximal clamping unit 10 and further attached to the remaining components comprising the invention by distal clamping unit 20,
2. an external shield element (not depicted),
3. one or more diffusion elements including inner diffusion element 40, mid-layer diffusion element 42, and an outer diffusion element 44.

The above components are integrated into a common unit, which in its entirety is attached by the flexible attachment collar to a suitable cleaning unit.

As exhaust air leaves the cleaning unit's exhaust port or nozzle, usually at high velocity and as such capable of dispersing find and medium-sized particulate matter which may be suspended in the air or on surfaces in the vicinity of the cleaning unit, the exhaust air is channeled into the narrow passage created by the flexible attachment collar, which may range from one inch (2.54 cm) to three or more inches (7.62 cm) in diameter. The exhaust flow is then routed into the innermost diffusion elements, which like the middle and outer layer diffusion elements is composed of a fine synthetic mesh material with uniformly spaces apertures, such as standard monofilament nylon 75-micron mesh.

The exhaust air flow upon encountering the minute resistance presented by the diffusion elements assumes a vortexed flow pattern, and diffuses across the length of the passage presented by the closed-ended diffusion elements, ultimately passing through the openings presented in the shield element. The resultant exhaust air stream maintains a generally stable, vortexed pattern and has by passing through the diffusion elements assumed a flow pattern that is minimally disturbing to ambient surrounding air, and concurrently reduced in velocity as compared to an exhaust air stream discharged directly from an exhaust port.

The invention may take other slightly modified forms, to accommodate other outlet ports on cleaning units, which may for example have rectangular cross sections. Similarly, the general design of the invention may remain intact while the dimensions of the device are scaled up to accommodate larger and more powerful units such as those which may be found in purely commercial or industrial settings. In all cases, the general principles which govern the attenuation effect continue to apply and produce similar results. Finally, the invention may be installed in a generally horizontal as well as in a generally vertical position, producing similar desirable effects in both orientations. Positioning the invention at a 90-degree angle relative to the vacuum cleaning equipment may be desired and is achieved by a minor modification to the flexible attachment collar.

What is claimed is:

1. An exhaust turbulence attenuator for vacuum cleaning equipment comprising, in combination:
    a flexible attachment collar having an inlet and an outlet, said inlet being in direct communication with said vacuum cleaning equipment for receiving a flow of exhaust air from said vacuum cleaning equipment, said flexible attachment collar defining a channel;
a diffusion chamber being in direct communication with said flexible attachment collar, said diffusion chamber including a series of porous fabric layers of fine pore densities, said layers being arranged one inside another; and
    air control means for directing said flow of exhaust air from said inlet into said layers of said porous fabric layers and through said series of porous fabric layers, whereby the turbulent air flow produced by said vacuum cleaning equipment and carried by said flow of exhaust air is substantially directed into a vortexed flow pattern with a subsequent attenuation of turbulence by said porous fabric layers.

2. An exhaust turbulence attenuator as claimed in claim 1 wherein said flexible attachment collar further defines an intake chamber in direct communication with said inlet; whereby said flow of exhaust air from said vacuum cleaning equipment is substantially redirected.

3. An exhaust turbulence attenuator as claimed in claim 2 wherein said air control means defines a pair of proximate and distal clamping units, permitting restriction or full access of said flow exhaust air to said porous fabric layers.

4. An exhaust turbulence attenuator as claimed in claim 3 wherein said air control means substantially channel said exhaust air flow to the first of said porous fabric layer.

5. An exhaust turbulence attenuator as claimed in claim 1 wherein said porous fabric layers are synthetic mesh material.

6. An exhaust turbulence attenuator as claimed in claim 1 wherein said pore densities vary from 5 to 150 pores per linear inch.

7. An exhaust turbulence attenuator for vacuum cleaning equipment comprising, in combination: a flexible attachment collar having inlet means and outlet means, said inlet means receiving a flow of exhaust air from said vacuum cleaning equipment, said exhaust turbulence attenuator defining a diffusion chamber depending from said flexible attachment collar, said diffusion chamber including a series of porous fabric layers, an inner layer situated within a mid-layer situated in turn within an outer later, said layers being encased in an external shield element; and
    air control means for directing said exhaust air flow from said inlet into said diffusion chamber, whereby said exhaust air flow is channeled through said diffusion chamber and passes to the atmosphere through apertures provided in the external shield element.

8. An exhaust turbulence attenuator as claimed in claim 7 wherein said air control means includes proximate and distal clamping units which may be manipulated to regulate the passage of said exhaust air flow from said vacuum cleaning equipment into said diffusion chamber.

9. An exhaust turbulence attenuator as claimed in claim 7 wherein said porous fabric layers are synthetic mesh material.

* * * * *